US012761574B2

(12) United States Patent
Tatekawa et al.

(10) Patent No.: US 12,761,574 B2
(45) Date of Patent: Oct. 13, 2026

(54) FLUORESCENT GREEN TONER, ELECTROSTATIC IMAGE DEVELOPER, TONER CARTRIDGE, PROCESS CARTRIDGE, IMAGE FORMING APPARATUS, IMAGE FORMING METHOD, AND PRINTED MATERIAL

(71) Applicant: FUJIFILM BUSINESS INNOVATION CORP., Tokyo (JP)

(72) Inventors: Takahisa Tatekawa, Kanagawa (JP); Yukiaki Nakamura, Kanagawa (JP); Kohei Manabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 422 days.

(21) Appl. No.: 18/582,078

(22) Filed: Feb. 20, 2024

(65) Prior Publication Data

US 2024/0319627 A1 Sep. 26, 2024

(30) Foreign Application Priority Data

Mar. 24, 2023 (JP) ................................ 2023-049077

(51) Int. Cl.

| | |
|---|---|
| ***G03G 9/09*** | (2006.01) |
| ***C09K 11/06*** | (2006.01) |
| ***G03G 9/087*** | (2006.01) |
| ***G03G 15/08*** | (2006.01) |

(52) U.S. Cl.

CPC ............ *G03G 9/0926* (2013.01); *C09K 11/06* (2013.01); *G03G 9/08755* (2013.01); *G03G 9/0918* (2013.01); *G03G 9/0928* (2013.01); *G03G 15/08* (2013.01); *C09K 2211/10* (2013.01)

(58) Field of Classification Search

CPC ... G03G 9/0821; G03G 9/0926; G03G 9/0918

See application file for complete search history.

(56) References Cited

U.S. PATENT DOCUMENTS

| | | | |
|---|---|---|---|
| 2012/0219892 | A1 | 8/2012 | Ohno et al. |
| 2017/0218203 | A1 | 8/2017 | Harada et al. |
| 2021/0253750 | A1 | 8/2021 | Kembo et al. |

FOREIGN PATENT DOCUMENTS

| | | | |
|---|---|---|---|
| EP | 3882708 | A1 | 9/2021 |
| JP | 2012-189989 | A | 10/2012 |
| JP | 2016-034994 | A | 3/2016 |
| JP | 2017-003818 | A | 1/2017 |

(Continued)

OTHER PUBLICATIONS

Aug. 26, 2024 Extended European Search Report issued in European Patent Application No. 24158337.6.

*Primary Examiner* — Peter L Vajda

(74) *Attorney, Agent, or Firm* — Oliff PLC

(57) ABSTRACT

A fluorescent green toner includes toner particles including a fluorescent yellow dye Sy, a peak wavelength of a spectral reflectance of the fluorescent yellow dye Sy being at 500 nm or more and 550 nm or less, a yellow pigment Py, and at least one pigment Pgc selected from the group consisting of a green pigment and a cyan pigment, wherein CSy/(CPy+CPgc) is 0.01 or more and 0.3 or less, and (CSy+CPy)/CPgc is 0.3 or more and 1.5 or less, where CSy, CPy, and CPgc represent contents of the fluorescent yellow dye Sy, the yellow pigment Py, and the pigment Pgc in the toner particles, respectively.

20 Claims, 2 Drawing Sheets

(56) References Cited

FOREIGN PATENT DOCUMENTS

| | | | | | |
|---|---|---|---|---|---|
| JP | 2021-127433 | A | | 9/2021 | |
| WO | WO 2016-005196 | | * | 1/2016 | ............. C09B 67/08 |
| WO | WO-2016005196 | A1 | * | 1/2016 | ........... C09B 67/009 |

* cited by examiner

FLUORESCENT GREEN TONER, ELECTROSTATIC IMAGE DEVELOPER, TONER CARTRIDGE, PROCESS CARTRIDGE, IMAGE FORMING APPARATUS, IMAGE FORMING METHOD, AND PRINTED MATERIAL

CROSS-REFERENCE TO RELATED APPLICATIONS

This application is based on and claims priority under 35 USC 119 from Japanese Patent Application No. 2023-049077 filed Mar. 24, 2023.

BACKGROUND

(i) Technical Field

The present disclosure relates to a fluorescent green toner, an electrostatic image developer, a toner cartridge, a process cartridge, an image forming apparatus, an image forming method, and a printed material

(ii) Related Art

Japanese Unexamined Patent Application Publication No. 2012-189989 discloses an electrostatic image developing green toner that includes at least a binder resin and a coloring agent, the coloring agent including C. I. Solvent Green 5 and a coloring agent compound X that is a phthalocyanine pigment, wherein the content of C. I. Solvent Green 5 is 5% by mass or more and 50% by mass or less of the total amount of the coloring agent.

Japanese Unexamined Patent Application Publication No. 2021-127433 discloses resin particles that include a fluorescent coloring agent and a coloring pigment, wherein the resin particles and the fluorescent coloring agent have different hue angles, and the integral of the spectral reflectance (%) of the coloring pigment over wavelengths of A (nm)±30 nm is 2,500 or more, where A represents a wavelength (nm) at which a fluorescent peak of the spectral reflectance of the fluorescent coloring agent occurs.

SUMMARY

Aspects of non-limiting embodiments of the present disclosure relate to a fluorescent green toner with which images excellent in terms of lightness and chroma may be formed, compared with a fluorescent green toner including toner particles including a fluorescent yellow dye Sy, a peak wavelength of a spectral reflectance of the fluorescent yellow dye Sy being at 500 nm or more and 550 nm or less, a yellow pigment Py, and at least one pigment Pgc selected from the group consisting of a green pigment and a cyan pigment, wherein CSy/(CPy+CPgc) is less than 0.01 or more than 0.3, or (CSy+CPy)/CPgc is less than 0.3 or more than 1.5, where CSy, CPy, and CPgc represent contents of the fluorescent yellow dye Sy, the yellow pigment Py, and the pigment Pgc in the toner particles, respectively.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fluorescent green toner including toner particles including: a fluorescent yellow dye Sy, a peak wavelength of a spectral reflectance of the fluorescent yellow dye Sy being at 500 nm or more and 550 nm or less; a yellow pigment Py; and at least one pigment Pgc selected from the group consisting of a green pigment and a cyan pigment, wherein CSy/(CPy+CPgc) is 0.01 or more and 0.3 or less, and (CSy+CPy)/CPgc is 0.3 or more and 1.5 or less, where CSy, CPy, and CPgc represent contents of the fluorescent yellow dye Sy, the yellow pigment Py, and the pigment Pgc in the toner particles, respectively.

BRIEF DESCRIPTION OF THE DRAWINGS

Exemplary embodiments of the present disclosure will be described in detail based on the following figures, wherein.

DETAILED DESCRIPTION

Figure 1:
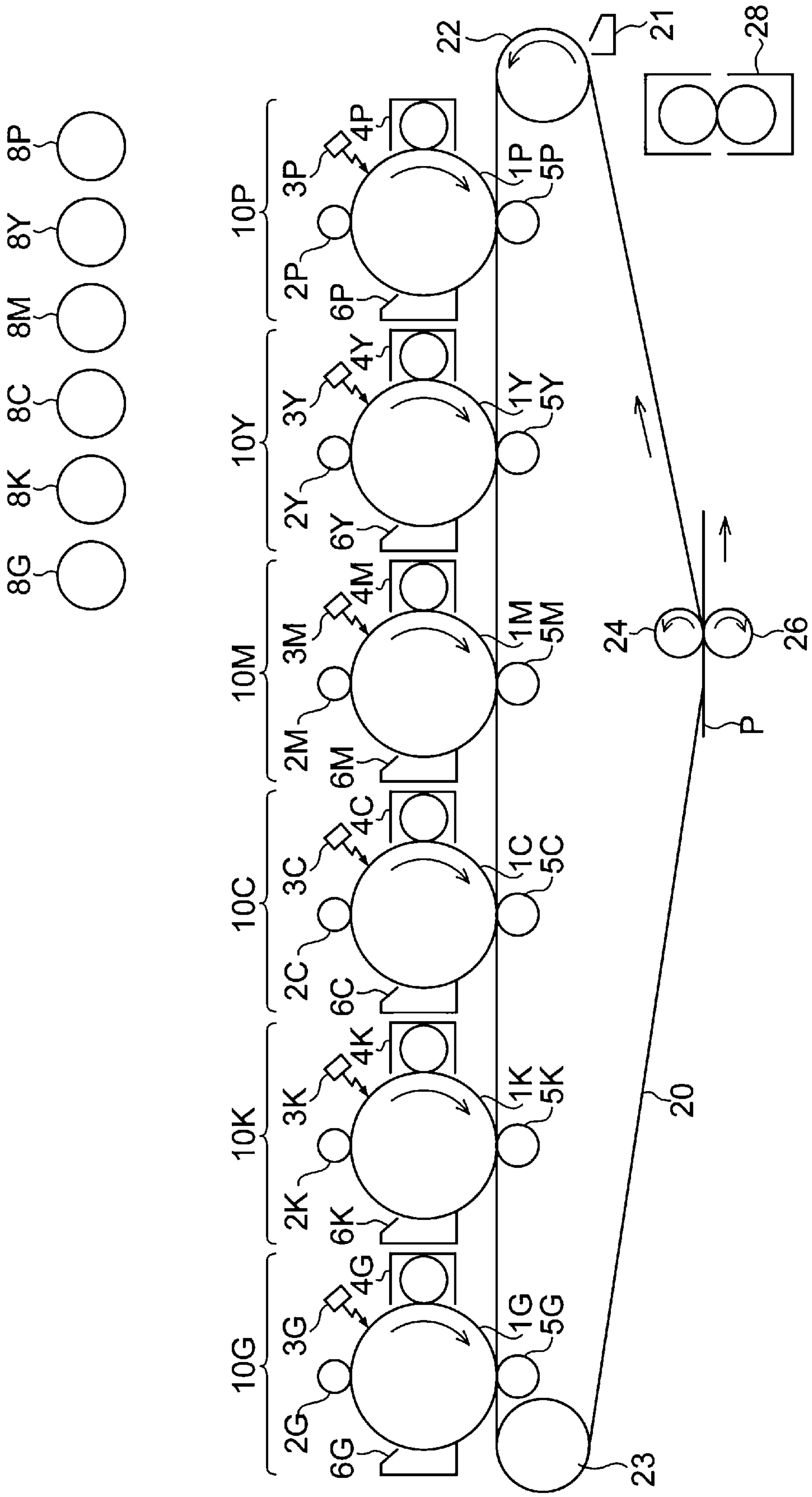
FIG. 1 is a schematic diagram illustrating an example of an image forming apparatus according to an exemplary embodiment.

Exemplary embodiments of the present disclosure are described below. It should be noted that the following description and Examples are illustrative of the exemplary embodiments but not restrictive of the scope of the exemplary embodiments.

In the present disclosure, a numerical range expressed using "to" means the range that includes the values described before and after "to" as the minimum and maximum values, respectively.

In the present disclosure, when numerical ranges are described in a stepwise manner, the upper or lower limit of a numerical range may be replaced with the upper or lower limit of another numerical range, respectively. In the present disclosure, the upper or lower limit of a numerical range may also be replaced with a value described in Examples below.

In the present disclosure, the term "step" refers not only to an individual step but also to a step that is not distinguishable from other steps but achieves the intended purpose of the step.

In the present disclosure, when an exemplary embodiment is described with reference to a drawing, the structure of the exemplary embodiment is not limited to the structure illustrated in the drawing. The sizes of the members illustrated in the attached drawing are conceptual and do not limit the relative relationship among the sizes of the members.

Each of the components described in the present disclosure may include a plurality of types of substances that correspond to the component. In the present disclosure, in the case where a composition includes a plurality of substances that correspond to a component of the composition, the content of the component in the composition is the total content of the substances in the composition unless otherwise specified.

Each of the components described in the present disclosure may include a plurality of types of particles that correspond to the component. In the case where a composition includes a plurality of particles that correspond to a component of the composition, the size of particles of the component is the size of particles of a mixture of the plurality of particles included in the composition unless otherwise specified.

In the present disclosure, the term "(meth) acryl" refers to both "acryl" and "methacryl", and the term "(meth)acrylate" refers to both "acrylate" and "methacrylate".

In the present disclosure, "fluorescent green toner", "electrostatic image developer", and "electrostatic image developing carrier" are also referred to as "green toner", "developer", and "carrier", respectively.

Fluorescent Green Toner

The fluorescent green toner according to this exemplary embodiment is a fluorescent green toner including toner particles including a fluorescent yellow dye Sy, a peak wavelength of a spectral reflectance of the fluorescent yellow dye Sy being at 500 nm or more and 550 nm or less, a yellow pigment Py, and at least one pigment Pgc selected from the group consisting of a green pigment and a cyan pigment, wherein CSy/(CPy+CPgc) is 0.01 or more and 0.3 or less, and (CSy+CPy)/CPgc is 0.3 or more and 1.5 or less, where CSy, CPy, and CPgc represent contents of the fluorescent yellow dye Sy, the yellow pigment Py, and the pigment Pgc in the toner particles, respectively.

Hereinafter, "at least one pigment Pgc selected from the group consisting of a green pigment and a cyan pigment" is also referred to as simply as "pigment Pgc".

The peak wavelength of the spectral reflectance of a dye or pigment is determined by the following method.

Toner particles that include only the dye or pigment, which is to be analyzed, as a coloring agent are prepared. A toner that includes the toner particles is prepared. The following description may be referred for details of the components of the toner particles which are other than a coloring agent and the external additive that are used in the production of the sample toner and the method for producing the toner. Specifically, the sample toner may be prepared using, for example, the toner production method described in Example 1, except that only the dye or pigment that is to be analyzed is used as a coloring agent.

A modification of an image forming apparatus "Revoria Press PC1120" produced by FUJIFILM Business Innovation Corp. is prepared. The sample toner is charged into a magenta developer. A blank image having an area coverage of 0% is formed on 100 OS coated paper sheets "OS Coat 127" produced by Oji Paper Co., Ltd. at a temperature of 22° C. and a humidity of 55% RH. Subsequently, a solid image having an area coverage of 100% (toner deposition density: 4.0 g/m2) is formed on an OS coated paper sheet using the sample toner.

The spectral reflectance of the solid image in the visible region is measured using a reflection spectrodensitometer "X-Rite 939" (aperture diameter: 4 mm) produced by X-Rite, Inc. at 10 positions randomly selected from the image.

The peak wavelength is determined on the basis of the spectral reflectance measured.

Since there is no coloring agent that produces a shade of fluorescent green alone among the fluorescent green toners known in the related art, in many cases, a shade of fluorescent green is produced by mixing a fluorescent yellow dye with a phthalocyanine pigment. However, as for the fluorescent green toners known in the related art, in the case where attempt is made to reproduce a color with high lightness and high chroma (e.g., a color displayed in "Color Sample TOKA FLASH VIVA DX 650"), the fluorescence of the fluorescent yellow dye may be impaired by concentration quenching. That is, there is room for improvement in terms of lightness (i.e., fluorescence).

The fluorescent green toner according to this exemplary embodiment includes toner particles including a fluorescent yellow dye Sy, a peak wavelength of a spectral reflectance of the fluorescent yellow dye Sy being at 500 nm or more and 550 nm or less, a yellow pigment Py, and at least one pigment Pgc selected from the group consisting of a green pigment and a cyan pigment.

Since the peak emission wavelengths of the fluorescent yellow dye Sy and the yellow pigment Py are close to each other, a large amount of yellow pigment can be added to the toner while a reduction in the reflectance of the fluorescent yellow dye is limited. Such a toner is capable of producing a shade of yellow with high chroma and high lightness. Furthermore, using the shade of yellow with high chroma and high lightness and at least one pigment Pgc selected from the group consisting of a green pigment and a cyan pigment which have a peak wavelength close to the peak emission wavelength of the fluorescent yellow dye in combination with each other in specific amounts limits a reduction in lightness and makes it easy to achieve an intended color gamut excellent in terms of lightness and chroma.

For the above reasons, images excellent in terms of lightness and chroma may be formed using the fluorescent green toner according to this exemplary embodiment.

In this exemplary embodiment, the terms "fluorescent pigment" and "fluorescent dye" refer to a pigment and a dye that emit light upon receiving light energy from the outside, respectively, while the terms "nonfluorescent pigment" and "nonfluorescent dye" refer to a pigment and a dye that do not emit light upon receiving light energy from the outside, respectively. In general, a fluorescent pigment and a fluorescent dye produce a shade by light reflection and light emission, while a nonfluorescent pigment and a nonfluorescent dye produce a shade only by light reflection.

Hereinafter, when the term "pigment", "yellow pigment", "green pigment", or "cyan pigment" is used alone, it refers to a nonfluorescent pigment.

Details of the structure of the fluorescent green toner according to this exemplary embodiment are described below.

Toner Particles

The toner particles include a fluorescent yellow dye Sy, a peak wavelength of a spectral reflectance of the fluorescent yellow dye Sy being at 500 nm or more and 550 nm or less, a yellow pigment Py, and at least one pigment Pgc selected from the group consisting of a green pigment and a cyan pigment.

The toner particles include a binder resin and a release agent, in addition to the fluorescent yellow dye Sy, the yellow pigment Py, and the pigment Pgc. The toner particles may further include additives as needed.

Fluorescent Yellow Dye Sy

The fluorescent yellow dye Sy is not limited and may be any fluorescent yellow dye the spectral reflectance of which has a peak wavelength of 500 nm or more and 550 nm or less.

The peak wavelength of the spectral reflectance of the fluorescent yellow dye Sy is preferably 510 nm or more and 530 nm or less in order to increase the likelihood of formation of images having high chroma and high lightness.

Specific examples of the fluorescent yellow dye Sy include C. I. Solvent Green 5, C. I. Solvent Yellow 98, and C. I. Solvent Yellow 160:1.

In particular, C. I. Solvent Green 5 and C. I. Solvent Yellow 98 are preferable in order to increase the likelihood of formation of images having high chroma and high lightness.

Yellow Pigment Py

The yellow pigment Py is not limited.

The spectral reflectance of the yellow pigment Py in a visible region of 520 nm or more is more preferably 70% or more.

The yellow pigment Py may be selected from the yellow pigments known in the related art as needed.

Examples of the yellow pigments include chrome yellow, zinc yellow, yellow iron oxide, cadmium yellow, chrome yellow, Hansa Yellow, Hansa Yellow 10G, Benzidine Yellow G, Benzidine Yellow GR, threne yellow, quinoline yellow, Permanent Yellow NCG, C. I. Pigment Yellow 17, C. I. Pigment Yellow 74, C. I. Pigment Yellow 93, C. I. Pigment Yellow 97, C. I. Pigment Yellow 154, C. I. Pigment Yellow 155, C. I. Pigment Yellow 180, and C. I. Pigment Yellow 185.

Among these, for example, C. I. Pigment Yellow 74, C. I. Pigment Yellow 180, and C. I. Pigment Yellow 185 are preferable in order to increase the likelihood of formation of images having high chroma and high lightness, and C. I. Pigment Yellow 74 and C. I. Pigment Yellow 180 are particularly preferable.

Pigment Pgc

The pigment Pgc is not limited and may be any green or cyan pigment.

The peak wavelength of the spectral reflectance of the green pigment used as a pigment Pgc is preferably 480 nm or more and 530 nm or less and is more preferably 490 nm or more and 520 nm or less.

The peak wavelength of the spectral reflectance of the cyan pigment used as a pigment Pgc is preferably 450 nm or more and 490 nm or less and is more preferably 460 nm or more and 480 nm or less.

The above green pigment may be selected appropriately from the green pigments known in the related art.

Examples of the green pigments include chromium oxide, chrome green, Malachite Green Lake, Final Yellow Green G, C. I. Pigment Green 7, and C. I. Pigment Green 36.

Among these, C. I. Pigment Green 36 and C. I. Pigment Green 7 are preferable in order to increase the likelihood of formation of images having high chroma and high lightness.

The cyan pigment may be selected appropriately from the cyan pigments known in the related art.

Examples of the cyan pigments include Prussian blue, cobalt blue, alkali blue lake, Victoria blue lake, Fast Sky Blue, Indanthrene Blue BC, aniline blue, ultramarine blue, Calco Oil Blue, methylene blue chloride, phthalocyanine blue, phthalocyanine green, Malachite green oxalate, C. I. Pigment Blue 15:1, and C. I. Pigment Blue 15:3.

Among these, C. I. Pigment Blue 15:3 is preferable in order to increase the likelihood of formation of images having high chroma and high lightness.

Content

In the fluorescent green toner according to this exemplary embodiment, CSy/(CPy+CPgc) is 0.01 or more and 0.3 or less, and (CSy+CPy)/CPgc is 0.3 or more and 1.5 or less, where CSy, CPy, and CPgc represent the contents of the fluorescent yellow dye Sy, the yellow pigment Py, and the pigment Pgc in the toner particles, respectively.

Since the above content relationship is satisfied, images having high chroma and high lightness may be formed using the fluorescent green toner.

The number of types of the fluorescent yellow dye Sy, the yellow pigment Py, or the pigment Pgc may be only one or two or more. In the case where two or more types of pigments are used, the total content of the pigments satisfies the above relationship.

In order to form images having further high chroma and further high lightness, CSy/(CPy+CPgc) is preferably 0.05 or more and 0.2 or less.

In order to form images having further high chroma and further high lightness, (CSy+CPy)/CPgc is preferably 0.45 or more and 1.0 or less.

That is, in order to form images having further high chroma and further high lightness, it is preferable that CSy/(CPy+CPgc) be 0.05 or more and 0.2 or less and (CSy+CPy)/CPgc be 0.45 or more and 1.0 or less.

The content CSy of the fluorescent yellow dye Sy, the content CPy of the yellow pigment Py, and the content CPgc of the pigment Pgc are determined in the following manner.

The toner is dissolved in an organic solvent, such as ethyl acetate. The content of a dye is calculated on the basis of the peak intensity measured by liquid chromatography. The content of a pigment can also be calculated by dissolving the toner in an organic solvent and separating a pigment insoluble in the solvent.

Preferable Aspect

In the fluorescent green toner according to this exemplary embodiment, it is preferable that the content CSy of the fluorescent yellow dye Sy be 0.1% by mass or more and 2.0% by mass or less, the content CPy of the yellow pigment Py be 1.5% by mass or more and 5.0% by mass or less, and the content CPgc of the pigment Pgc be 3.0% by mass or more and 10.0% by mass or less.

In the fluorescent green toner according to this exemplary embodiment, it is more preferable that the content CSy of the fluorescent yellow dye Sy be 0.1% by mass or more and 1.5% by mass or less, the content CPy of the yellow pigment Py be 3.0% by mass or more and 5.0% by mass or less, and the content CPgc of the pigment Pgc be 5.0% by mass or more and 8.0% by mass or less.

When the content CSy of the fluorescent yellow dye Sy, the content CPy of the yellow pigment Py, and the content CPgc of the pigment Pgc fall within the respective ranges, it may become easy to form images having further high chroma and further high lightness.

In the fluorescent green toner according to this exemplary embodiment, it is preferable that $0.65RSy \leq RPy$ and $0.55RSy \leq RPgc$, where RSy represents the spectral reflectance of the fluorescent yellow dye Sy at a peak wavelength X, RPy represents the spectral reflectance of the yellow pigment Py at the wavelength X, and RPgc represents the spectral reflectance of the pigment Pgc at the wavelength X.

It is more preferable that the spectral reflectance values RSy and RPy satisfy $0.65RSy \leq RPy \leq 1.0RSy$. It is further preferable that $0.70RSy \leq RPy \leq 1.0RSy$. It is more preferable that the spectral reflectance values RSy and RPgc satisfy $0.55RSy \leq RPgc \leq 1.0RSy$. It is further preferable that $0.60RSy \leq RPgc \leq 1.0RSy$.

When the spectral reflectance values RSy, RPy, and RPgc satisfy the above relationships, it may become easy to form images having further high chroma and further high lightness.

When the spectral reflectance values RPy and RPgc satisfy $0.8RPy \leq RPgc \leq 1.2RPy$ and preferably satisfy $0.9RPy \leq RPgc \leq 1.1RPy$, it may become easy to form images having further high chroma and further high lightness.

In the fluorescent green toner according to this exemplary embodiment, it is preferable that the pigment Pgc be a green pigment, the fluorescent yellow dye Sy be C. I. Solvent Green 5 or C. I. Solvent Yellow 98, and the green pigment be C. I. Pigment Green 36 or C. I. Pigment Green 7.

When the pigment Pgc is a green pigment and the fluorescent yellow dye Sy and the green pigment are each selected from the above pigments, it may become easy to form images having further high chroma and further high lightness.

In the fluorescent green toner according to this exemplary embodiment, the toner particles may include a coloring agent other than the fluorescent yellow dye Sy, the yellow pigment Py, or the pigment Pgc.

In such a case, the content of the coloring agent other than the fluorescent yellow dye Sy, the yellow pigment Py, or the pigment Pgc is preferably 20% by mass or less, is more preferably 10% by mass or less, and is particularly preferably 0% by mass of the total amount of the coloring agent.

Binder Resin

Examples of the binder resin include vinyl resins that are homopolymers of the following monomers or copolymers of two or more monomers selected from the following monomers: styrenes, Is styrene, para-chlorostyrene, and α-methylstyrene; (meth)acrylates, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the binder resin further include non-vinyl resins, such as epoxy resins, polyester resins, polyurethane resins, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The above binder resins may be used alone or in combination of two or more.

A polyester resin may be suitably used as a binder resin.

Examples of the polyester resin include the polyester resins known in the related art.

Examples of the polyester resin include condensation polymers of a polyvalent carboxylic acid and a polyhydric alcohol. The polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, for example, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, for example, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The glass transition temperature Tg of the polyester resin is preferably 50° C. or more and 80° C. or less and is more preferably 50° C. or more and 65° C. or less.

The glass transition temperature of the polyester resin is determined from a differential scanning calorimetry (DSC) curve obtained by DSC. More specifically, the glass transition temperature of the polyester resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the polyester resin is preferably 5,000 or more and 1,000,000 or less and is more preferably 7,000 or more and 500,000 or less.

The number average molecular weight Mn of the polyester resin may be 2,000 or more and 100,000 or less.

The molecular weight distribution index Mw/Mn of the polyester resin is preferably 1.5 or more and 100 or less and is more preferably 2 or more and 60 or less.

The weight average molecular weight and number average molecular weight of the polyester resin are determined by gel permeation chromatography (GPC). Specifically, the molecular weights of the polyester resin are determined by GPC using a "HLC-8120GPC" produced by Tosoh Corporation as measuring equipment, a column "TSKgel SuperHM-M (15 cm)" produced by Tosoh Corporation, and a THF solvent. The weight average molecular weight and number average molecular weight of the polyester resin are determined on the basis of the results of the measurement using a molecular-weight calibration curve based on monodisperse polystyrene standard samples.

The polyester resin may be produced by any suitable production method known in the related art. Specifically, the polyester resin may be produced by, for example, a method in which polymerization is performed at 180° C. or more and 230° C. or less, the pressure inside the reaction system is reduced as needed, and water and alcohols that are generated by condensation are removed.

In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where a monomer having low miscibility is present, a condensation reaction of the monomers with an acid or alcohol that is to undergo a polycondensation reaction with the monomers may be performed in advance and subsequently polycondensation of the resulting polymers with the other components may be performed.

The content of the binder resin in the entire toner particles is preferably 40% by mass or more and 95% by mass or less, is more preferably 50% by mass or more and 90% by mass or less, and is further preferably 60% by mass or more and 85% by mass or less.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

Among these, in order to reduce variations in the gloss of the resulting images, a hydrocarbon wax is preferably used, and a paraffin wax or a polyethylene wax is more preferably used.

The melting temperature of the release agent is preferably 50° C. or more and 110° C. or less and is more preferably 60° C. or more and 100° C. or less.

The above melting temperature is determined from the "melting peak temperature" according to a method for determining melting temperature which is described in JIS K 7121:1987 "Testing Methods for Transition Temperatures of Plastics" using a differential scanning calorimetry (DSC) curve obtained by DSC.

In order to reduce variations in the gloss of the resulting images, the size of domains of the release agent included in the toner particles is preferably 40% or less, is more preferably 25% or less, and is particularly preferably 5% or more and 15% or less of the size of the toner particles.

The method for measuring the size of domains of the release agent is described below.

The size of domains of the release agent is determined by observation of a cross section of the toner particles.

The method for observing a cross section of the toner particles is as described below.

A toner particle (or a toner particle including an external additive adhered thereon) is mixed with an epoxy resin so as to be buried in the epoxy resin. The epoxy resin is then solidified. The resulting solid is cut with an ultramicrotome apparatus "Ultracut UCT" produced by Leica Biosystems into a thin specimen having a thickness of 80 nm or more and 130 nm or less. The thin specimen is stained with ruthenium tetroxide in a desiccator at 30° C. for 3 hours. A transmission image-mode STEM observation image (acceleration voltage: 30 kV, magnification: 20,000 times) of the stained thin specimen is captured with an ultra-high-resolution field-emission scanning electron microscope (FE-SEM) "S-4800" produced by Hitachi High-Tech Corporation.

In the toner particle, a binder resin (crystalline resin and amorphous resin) and a release agent are distinguished from one another on the basis of contrast and shape. In the STEM observation image, since the binder resin other than the release agent includes a number of double bond portions and stained with ruthenium tetroxide, a release agent portion and a resin portion other than the release agent can be distinguished from each other. Specifically, by ruthenium staining, a release agent is stained most slightly, a crystalline resin (e.g., a crystalline polyester resin) is stained second most slightly, and an amorphous resin (e.g., an amorphous polyester resin) is stained most intensely. When contrast is adjusted appropriately, a release agent appears as white, an amorphous resin appears as black, and a crystalline resin appears as light gray. Domains of the release agent can be distinguished from the others in the above-described manner.

The size of domains of the release agent is measured by the following method.

Using the STEM observation image, domains of the release agent which have a size of 0.5 μm or more are selected from each toner particle. The maximum sizes of the domains are measured, and the arithmetic average thereof is calculated. The above measurement is done for 100 toner particles, and the arithmetic average of the maximum sizes of the 100 toner particles is calculated and used as "size of domains of the release agent".

The content of the release agent is preferably 1% by mass or more and 20% by mass or less, is more preferably 2% by mass or more and 20% by mass or less, and is further preferably 3% by mass or more and 15% by mass or less of the total mass of the toner particles.

Other Additives

Examples of the other additives include additives known in the related art, such as a magnetic substance, a charge-controlling agent, and an inorganic powder. These additives may be added to the toner particles as internal additives.

Properties, Etc. of Toner Particles

The toner particles may have a single-layer structure or a "core-shell" structure constituted by a core (i.e., core particle) and a coating layer (i.e., shell layer) covering the core.

The core-shell structure of the toner particles may be constituted by, for example, a core including a binder resin and, as needed, other additives such as a coloring agent and a release agent and by a coating layer including a binder resin.

The volume average diameter D50v of the toner particles is preferably 2 μm or more and 10 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5-mass % aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.

The toner particles preferably have an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO{\cdot}SiO_2$ particles, $K_2O{\cdot}(TiO_2)_n$ particles, $Al_2O_3{\cdot}2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more.

The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate, or a melamine resin; and particles of a cleaning lubricant, such as a metal salt of a higher fatty acid, such as zinc stearate, or a fluorine-contained resin.

The amount of the external additive used is preferably 0.01% by mass or more and 5% by mass or less and is more preferably 0.01% by mass or more and 2.0% by mass or less of the amount of the toner particles.

When a solid image is formed on a coated paper sheet using the fluorescent green toner according to this exemplary embodiment, the reflectance measured at a reflection peak of the spectral reflection spectrum of the solid image is preferably 70% or more.

Method for Producing Fluorescent Green Toner

The fluorescent green toner according to this exemplary embodiment is produced by, after the preparation of the toner particles, depositing an external additive on the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used. Among these methods, aggregation coalescence may be used in order to prepare the toner particles.

In the case where aggregation coalescence is used for producing the toner particles, the following production method may be used.

A production method including:

- a step of preparing a resin particle dispersion liquid in which particles of a resin that serves as a binder resin are dispersed (i.e., resin particle dispersion liquid preparation step);
- a step of preparing a dispersion liquid in which particles colored with the fluorescent yellow dye Sy are dispersed (i.e., dye-colored particle dispersion liquid preparation step);
- a step of preparing a pigment dispersion liquid in which the yellow pigment Py is dispersed and a pigment dispersion liquid in which the pigment Pgc is dispersed (i.e., pigment dispersion liquid preparation step);
- a step of mixing the resin particle dispersion liquid, the dye-colored particle dispersion liquid, and the pigment dispersion liquids with one another to form a mixed dispersion liquid, and causing the resulting mixed particles to aggregate with one another to form aggregated particles (i.e., aggregated particle formation step); and
- a step of heating the resulting aggregated particle dispersion liquid in which the aggregated particles are dispersed to cause fusion and coalescence of the aggregated particles in order to form green toner particles (i.e., fusion-coalescence step).

Each of the above steps is described below in detail.

Resin Particle Dispersion Liquid Preparation Step

The resin particle dispersion liquid is prepared by, for example, dispersing particles of a resin that serves as a binder resin in a dispersion medium using a surfactant.

Examples of the dispersion medium used for preparing the resin particle dispersion liquid include aqueous media.

Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

In the preparation of the resin particle dispersion liquid, the resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the resin particles used, the resin particles may be dispersed in the dispersion medium by phase-inversion emulsification. Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform phase inversion from W/O to O/W and disperse the resin in the aqueous medium in the form of particles.

The volume average size of the resin particles dispersed in the resin particle dispersion liquid is preferably, for example, 0.01 μm or more and 1 μm or less, is more preferably 0.08 μm or more and 0.8 μm or less, and is further preferably 0.1 μm or more and 0.6 μm or less. The volume average size of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average sizes of particles included in the other dispersion liquids are also determined in the above-described manner.

The content of the resin particles included in the resin particle dispersion liquid is preferably 5% by mass or more and 50% by mass or less and is more preferably 10% by mass or more and 40% by mass or less.

The method for preparing the release agent particle dispersion liquid is the same as the method for preparing the resin particle dispersion liquid. The content of the release agent particles in the release agent particle dispersion liquid is preferably 5% by mass or more and 50% by mass or less and is more preferably 10% by mass or more and 40% by mass or less.

Dye-Colored Particle Dispersion Liquid Preparation Step

The dye-colored particle dispersion liquid is prepared by, for example, mixing the fluorescent yellow dye Sy with a resin while heating is performed, pulverizing the resulting mixture to form colored particles, and dispersing the colored particles in a dispersion medium with a surfactant.

The resin mixed with the fluorescent yellow dye Sy while heated is a resin that serves as a binder resin.

For pulverizing the above mixture, pulverizing machines known in the related art, such as Banbury mixer or a jet mill, may be used. A plurality of pulverizing machines may be used in combination.

Examples of the dispersion medium used for the dye-colored particles include an aqueous medium.

Examples of the aqueous medium include water, such as distilled water or ion-exchange water, and an alcohol. The above aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, the anionic and cationic surfactants may be used. The nonionic surfactants may be used in combination with the anionic surfactants and the cationic surfactants.

These surfactants may be used alone or in combination of two or more.

Examples of the method for dispersing the dye-colored particles in the dispersion medium include a dispersion method in which a rotary-shearing homogenizer, a ball mill, a sand mill, a dyno mill, or Key Mill that includes media, or the like is used.

The volume average size of the dye-colored particles included in the dye-colored particle dispersion liquid is preferably, for example, 0.05 μm or more and 5 μm or less and is more preferably 0.1 μm or more and 2 μm or less. The size of the dye-colored particles can be adjusted by changing, for example, the method of the dispersion treatment and the amount of time during which the dispersion treatment is performed.

The content of the dye-colored particles included in the dye-colored particle dispersion liquid is preferably 5% by mass or more and 50% by mass or less and is more preferably 10% by mass or more and 40% by mass or less.

Pigment Dispersion Liquid Preparation Step

The pigment dispersion liquids are prepared by, for example, dispersing the yellow pigment Py and the pigment Pgc in respective dispersion media with a surfactant.

Examples of the dispersion medium used for preparing the pigment dispersion liquids include an aqueous medium.

Examples of the aqueous medium include water, such as distilled water or ion-exchange water, and an alcohol. The above aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, the anionic and cationic surfactants may be used. The nonionic surfactants may be used in combination with the anionic surfactants and the cationic surfactants.

These surfactants may be used alone or in combination of two or more.

Examples of the method for dispersing the yellow pigment Py and the pigment Pgc in the respective dispersion media include a dispersion method in which a rotary-shearing homogenizer, a ball mill, a sand mill, a dyno mill, or Key Mill that includes media, or the like is used.

The volume average particle sizes of the yellow pigment Py and the pigment Pgc are preferably, for example, 50 nm or more and 800 nm or less, are more preferably 150 nm or more and 600 nm or less, and are further preferably 250 nm or more and 400 nm or less. The sizes of particles of the yellow pigment Py and the pigment Pgc can be adjusted by changing, for example, the method of the dispersion treatment and the amount of time during which the dispersion treatment is performed.

The contents of the yellow pigment Py and the pigment Pgc in the respective pigment dispersion liquids are preferably 5% by mass or more and 50% by mass or less and are more preferably 10% by mass or more and 40% by mass or less.

Aggregated Particle Formation Step

The resin particle dispersion liquid is mixed with a dispersion liquid including a fluorescent pigment having a hydrophilic radical, a dispersion liquid containing a pigment including a halogen atom, and the release agent particle dispersion liquid. In the resulting mixed dispersion liquid, heteroaggregation of the resin particles, the fluorescent pigment having a hydrophilic radical, the pigment including a halogen atom, and the release agent particles is performed to form aggregated particles that include the resin particles, the fluorescent pigment having a hydrophilic radical, the pigment including a halogen atom, and the release agent particles and that have a diameter close to that of the intended toner particles.

Specifically, for example, a coagulant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to a temperature close to the glass transition temperature of the resin particles (specifically, e.g., [Glass transition temperature of the resin particles −30° C.] or more and [the Glass transition temperature −10° C.] or less), and thereby the particles dispersed in the mixed dispersion liquid are caused to aggregate together to form aggregated particles.

In the aggregated particle formation step, alternatively, for example, the above coagulant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the coagulant include surfactants, inorganic metal salts, and divalent or higher metal complexes that have a polarity opposite to that of the surfactant included in the mixed dispersion liquid. Using a metal complex as a coagulant reduces the amount of surfactant used and, as a result, charging characteristics may be enhanced.

An additive capable of forming a complex or a bond similar to a complex with the metal ions contained in the coagulant may optionally be used in combination with the coagulant. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent used is preferably 0.01 parts by mass or more and 5.0 parts by mass or less and is more preferably 0.1 parts by mass or more and less than 3.0 parts by mass relative to 100 parts by mass of the resin particles.

Fusion Coalescence Step

The aggregated particle dispersion liquid in which the aggregated particles are dispersed is heated to, for example, a temperature equal to or higher than the glass transition temperature of the resin particles (e.g., [Glass transition temperature of the resin particles+10° C.] or more and [the Glass transition temperature+30° C.] or less) in order to perform fusion and coalescence of the aggregated particles and form toner particles.

The toner particles are produced through the above-described steps.

The toner particles may be produced by, subsequent to the preparation of the aggregated particle dispersion liquid in which the aggregated particles are dispersed, mixing the aggregated particle dispersion liquid with a resin particle dispersion liquid in which resin particles are dispersed and causing aggregation such that the resin particles are adhered onto the surfaces of the aggregated particles to form second aggregated particles; and heating a second aggregated particle dispersion liquid in which the second aggregated particles are dispersed to cause fusion and coalescence of the second aggregated particles and form toner particles having a core-shell structure.

After the completion of the fusion-coalescence step, the toner particles included in the dispersion liquid are subjected to any suitable cleaning step, solid-liquid separation step, and drying step that are known in the related art in order to obtain dried toner particles. In the cleaning step, the toner particles may be subjected to displacement washing using ion-exchange water to a sufficient degree from the viewpoint of electrification characteristics. Examples of a solid-liquid separation method used in the solid-liquid separation step include suction filtration and pressure filtration from the viewpoint of productivity. Examples of a drying method used in the drying step include freeze-drying, flash drying, fluidized drying, and vibrating fluidized drying from the viewpoint of productivity.

The toner according to this exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Electrostatic Image Developer

An electrostatic image developer according to this exemplary embodiment includes at least the green toner according to this exemplary embodiment.

The electrostatic image developer according to this exemplary embodiment may be a single component developer including only the green toner according to this exemplary embodiment or may be a two-component developer that is a mixture of the green toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin.

The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin. The coat resin and the matrix resin may optionally include additives, such as conductive particles. Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a resin by, for example, using a coating-layer forming solution prepared by dissolving the coat resin and various types of additives (used as needed) in a suitable solvent. The type of the solvent is not limited and may be selected with consideration of the type of the resin used, case of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the green toner to the carrier in the two-component developer is preferably Green toner:Carrier=1:100 to 30:100 and is more preferably 3:100 to 20:100.

Image Forming Apparatus and Image Forming Method

An image forming apparatus and an image forming method according to this exemplary embodiment are described below.

The image forming apparatus according to this exemplary embodiment includes an image holding member; a charging unit that charges the surface of the image holding member; an electrostatic image formation unit that forms an electrostatic image on the charged surface of the image holding member; a developing unit that includes an electrostatic image developer and develops the electrostatic image formed on the surface of the image holding member with the electrostatic image developer to form a toner image; a transfer unit that transfers the toner image formed on the surface of the image holding member onto the surface of a recording medium; and a fixing unit that fixes the toner image onto the surface of the recording medium. The electrostatic image developer is the electrostatic image developer according to this exemplary embodiment.

The image forming apparatus according to this exemplary embodiment uses an image forming method (image forming method according to this exemplary embodiment) including charging the surface of the image holding member; forming an electrostatic image on the charged surface of the image holding member; developing the electrostatic image formed on the surface of the image holding member with the electrostatic image developer according to this exemplary embodiment to form a toner image; transferring the toner image formed on the surface of the image holding member onto the surface of a recording medium; and fixing the toner image onto the surface of the recording medium.

The image forming apparatus according to this exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning unit that cleans the surface of the image holding member subsequent to the transfer of the toner image before the image holding member is again charged; and an image forming apparatus including a static-erasing unit that erases static by irradiating the surface of an image holding member with static-erasing light subsequent to the transfer of the toner image before the image holding member is again charged.

In the case where the image forming apparatus according to this exemplary embodiment is the intermediate-transfer image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to this exemplary embodiment, for example, a portion including the developing unit may have a cartridge structure (i.e., process cartridge) detachably attachable to the image forming apparatus. An example of the process cartridge is a process cartridge including the electrostatic image developer according to this exemplary embodiment and the developing unit.

An example of the image forming apparatus according to this exemplary embodiment is described below, but the image forming apparatus is not limited thereto. Hereinafter, only components illustrated in drawings are described; others are omitted.

A sextuple tandem image forming apparatus that includes six image forming units arranged in series is described below as an example of the image forming apparatus according to this exemplary embodiment. Note that the tandem image forming apparatus is not limited to this; the image forming apparatus according to this exemplary embodiment may be a quintuple tandem image forming apparatus that includes five image forming units arranged in series or a quadruple tandem image forming apparatus that includes four image forming units arranged in series.

FIG. 1 schematically illustrates the image forming apparatus according to this exemplary embodiment. FIG. 1 illustrates a sextuple tandem, intermediate transfer-type image forming apparatus The image forming apparatus illustrated in FIG. 1 includes first to sixth image formation units 10P, 10Y, 10M, 10C, 10K, and 10G, which are electrophotographic image forming units that form pink (P), yellow (Y), magenta (M), cyan (C), black (K), and green (G) images, respectively, on the basis of color separation image data. The image formation units (hereinafter, referred to simply as "units") 10P, 10Y, 10M, 10C, 10K, and 10G are horizontally arranged in parallel at a predetermined distance from one another. The units 10P, 10Y, 10M, 10C, 10K, and 10G may be process cartridges detachably attachable to the image forming apparatus.

An intermediate transfer belt (an example of the intermediate transfer body) 20 runs below and extends over the units 10P, 10Y, 10M, 10C, 10K, and 10G so as to pass through the units. The intermediate transfer belt 20 is wound around a drive roller 22, a support roller 23, and a counter roller 24 arranged to contact with the inner surface of the intermediate transfer belt 20 and runs in the direction from the first unit 10P to the sixth unit 10G. An intermediate transfer body-cleaning device 21 is disposed so as to contact with the image holding member-side surface of the intermediate transfer belt 20 and to face the drive roller 22.

Developing devices (i.e., examples of developing units) 4P, 4Y, 4M, 4C, 4K, and 4G of the units 10P, 10Y, 10M, 10C, 10K, and 10G are supplied with pink, yellow, magenta, cyan, black, and green toners stored in toner cartridges 8P, 8Y, 8M, 8C, 8K, and 8G, respectively.

Since the first to sixth units 10P, 10Y, 10M, 10C, 10K, and 10G have the same structure and the same action, the following description is made with reference to, as a representative, the sixth unit 10G that forms a green image.

The sixth unit 10G includes a photosensitive member 1G serving as an image holding member. The following components are disposed around the photosensitive member 1G sequentially in the counterclockwise direction: a charging roller (example of the charging unit) 2G that charges the surface of the photosensitive member 1G at a predetermined potential; an exposure device (example of the electrostatic image formation unit) 3G that forms an electrostatic image by irradiating the charged surface of the photosensitive member 1G with a laser beam based on a color separated image signal; a developing device (example of the developing unit) 4G that develops the electrostatic image by supplying a toner to the electrostatic image; a first transfer roller (example of the first transfer subunit) 5G that transfers the developed toner image to the intermediate transfer belt 20; and a photosensitive-member cleaning device (example of the cleaning unit) 6G that removes a toner remaining on the surface of the photosensitive member 1G after the first transfer.

The first transfer roller 5G is disposed so as to contact with the inner surface of the intermediate transfer belt 20 and to face the photosensitive member 1G. Each of the first transfer rollers 5Y, 5P, 5M, 5C, 5G, and 5K of the respective units is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a green image in the sixth unit 10G is described below.

Before the action starts, the surface of the photosensitive member 1G is charged at a potential of −600 to −800 V by the charging roller 2G.

The photosensitive member 1G is formed by stacking a photosensitive layer on a conductive substrate (e.g., volume resistivity at 20° C.: $1\times10^{-6}$ Ωcm or less). The photosensitive layer is normally of high resistance (comparable with the resistance of ordinary resins), but, upon being irradiated with the laser beam, the specific resistance of the portion irradiated with the laser beam varies. Thus, the exposure device 3G irradiates the surface of the charged photosensitive member 1G with the laser beam on the basis of the image data of the green image sent from the controller (not illustrated). As a result, an electrostatic image of green image pattern is formed on the surface of the photosensitive member 1G.

The term "electrostatic image" used herein refers to an image formed on the surface of the photosensitive member 1G by charging, the image being a "negative latent image" formed by irradiating a portion of the photosensitive layer with a laser beam emitted by the exposure device 3G to reduce the specific resistance of the irradiated portion such that the charges on the irradiated surface of the photosensitive member 1G discharge while the charges on the portion that is not irradiated with the laser beam remain.

The electrostatic image, which is formed on the photosensitive member 1G as described above, is sent to the predetermined developing position by the rotating photosensitive member 1G. The electrostatic image on the photosensitive member 1G is developed and visualized in the form of a toner image by the developing device 4G at the developing position.

The developing device 4G includes an electrostatic image developer including, for example, at least, a green toner and a carrier. The green toner is stirred in the developing device 4G to be charged by friction and supported on a developer roller (example of the developer support), carrying an electric charge of the same polarity (i.e., negative) as the electric charge generated on the photosensitive member 1G. The green toner is electrostatically adhered to the erased latent image portion on the surface of the photosensitive member 1G as the surface of the photosensitive member 1G passes through the developing device 4G. Thus, the latent image is developed using the green toner. The photosensitive member 1G on which the green toner image is formed keeps rotating at the predetermined rate, thereby transporting the toner image developed on the photosensitive member 1G to the predetermined first transfer position.

Upon the green toner image on the photosensitive member 1G reaching the first transfer position, first transfer bias is applied to the first transfer roller 5G so as to generate an electrostatic force on the toner image in the direction from the photosensitive member 1G toward the first transfer roller 5G. Thus, the toner image on the photosensitive member 1G is transferred to the intermediate transfer belt 20. The transfer bias applied has the opposite polarity (+) to that of the toner (−) and controlled to be, for example, in the sixth unit 10G, +10 μA by a controller (not illustrated).

After the toner image has been transferred from the photosensitive member 1G to the intermediate transfer belt 20, the photosensitive member 1G keeps rotating and is brought into contact with a cleaning blade included in the photosensitive member cleaning device 6G. The toner particles remaining on the photosensitive member 1G are removed by the photosensitive-member cleaning device 6G and then collected.

The intermediate transfer belt 20 is successively transported through the first to sixth image forming units 10P, 10Y, 10M, 10C, 10K, and 10G while toner images of the respective colors are stacked on top of another.

The resulting intermediate transfer belt 20 on which toner images of six colors are multiple-transferred in the first to sixth units is then transported to a second transfer section including a counter roller 24 contacting with the inner surface of the intermediate transfer belt 20 and a second transfer roller (example of the second transfer subunit) 26 disposed on the image-carrier-side of the intermediate transfer belt 20. A recording paper (example of the recording medium) P is fed by a feed mechanism into a narrow space between the second transfer roller 26 and the intermediate transfer belt 20 that contact with each other at the predetermined timing. The second transfer bias is then applied to the counter roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

After the toner image has been transferred from the intermediate transfer belt 20 to the recording paper P, the intermediate transfer belt 20 keeps running and is brought into contact with a cleaning blade included in the intermediate transfer body cleaning device 21. The toner particles remaining on the intermediate transfer belt 20 are removed by the intermediate transfer body cleaning device 21 and then collected.

The recording paper P on which the toner image is transferred is transported into a nip part of the fixing device (example of the fixing unit) 28 at which a pair of fixing rollers contact with each other. The toner image is fixed to the recording paper P to form a fixed image.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

The recording paper P, to which the color image has been fixed, is transported toward an exit portion. Thus, the series of the steps for forming a color image are terminated.

Process Cartridge and Toner Cartridge

A process cartridge according to this exemplary embodiment is described below.

The process cartridge according to this exemplary embodiment includes a developing unit that includes the electrostatic image developer according to this exemplary embodiment and develops an electrostatic image formed on the surface of an image holding member with the electrostatic image developer to form a toner image. The process cartridge according to this exemplary embodiment is detachably attachable to an image forming apparatus.

The structure of the process cartridge according to this exemplary embodiment is not limited to the above-described one. The process cartridge may further include, in addition to the developing unit, at least one unit selected from an image holding member, a charging unit, an electrostatic image formation unit, a transfer unit, etc.

An example of the process cartridge according to this exemplary embodiment is described below, but the process cartridge is not limited thereto. Hereinafter, only components illustrated in FIG. 2 are described; others are omitted.

Figure 2:
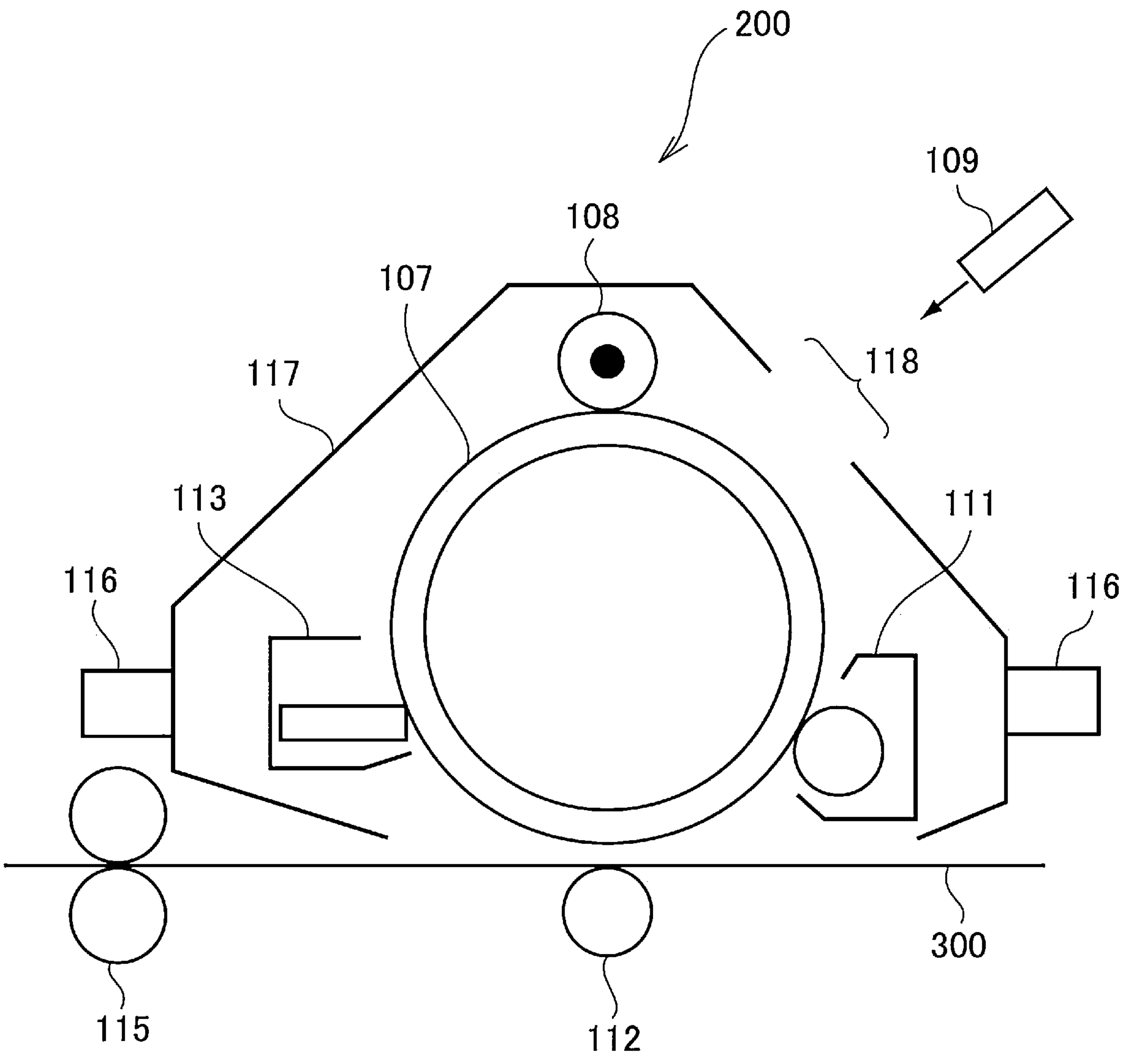
FIG. 2 is a schematic diagram illustrating an example of a process cartridge detachably attachable to the image forming apparatus according to this exemplary embodiment.

FIG. 2 schematically illustrates the process cartridge according to this exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic image formation unit), Reference numeral 112 denotes a transfer device (example of the transfer unit), Reference numeral 115 denotes a fixing device (example of the fixing unit), and the Reference numeral 300 denotes recording paper (example of the recording medium).

A toner cartridge according to this exemplary embodiment is described below.

The toner cartridge according to this exemplary embodiment is a toner cartridge that includes the fluorescent green toner according to this exemplary embodiment and is detachably attachable to an image forming apparatus. The toner cartridge includes a replenishment toner that is to be supplied to the developing unit disposed inside an image forming apparatus.

The image forming apparatus illustrated in FIG. 1 is an image forming apparatus that includes the toner cartridges 8Y, 8P, 8M, 8C, 8G, and 8K detachably attached to the image forming apparatus. Each of the developing devices 4Y, 4P, 4M, 4C, 4G, and 4K is connected to a specific one of the toner cartridges which corresponds to the color of the developing device with a toner supply pipe (not illustrated). When the amount of toner contained in a toner cartridge is small, the toner cartridge is replaced. The toner cartridge 8G is an example of the toner cartridge according to this exemplary embodiment and includes the green toner according to this exemplary embodiment. The toner cartridges 8P, 8Y, 8M, 8C, and 8K include pink, yellow, magenta, cyan, and black toners, respectively.

Printed Material

The printed material according to this exemplary embodiment includes a recording medium and an image formed on the surface of the recording medium using the fluorescent green toner according to this exemplary embodiment.

The printed material according to this exemplary embodiment is produced using the above-described image forming apparatus or method according to this exemplary embodiment.

Note that the image formed using the fluorescent green toner according to this exemplary embodiment may be any image (i.e., fixed image) formed using at least the fluorescent green toner according to this exemplary embodiment. Therefore, the image formed using the fluorescent green toner according to this exemplary embodiment may be an image formed using only the fluorescent green toner according to this exemplary embodiment or an image formed using the fluorescent green toner according to this exemplary embodiment and a toner of another color.

The printed material according to this exemplary embodiment includes at least an image formed on the surface of a recording medium using the fluorescent green toner according to this exemplary embodiment and may further include an image formed using a toner having a shade different from that of the fluorescent green toner according to this exemplary embodiment (e.g., the above pink, yellow, magenta, cyan, or black toner).

As described above, the recording medium included in the printed material according to this exemplary embodiment may be a recording paper sheet P, an OHP film, or the like.

EXAMPLES

Details of the exemplary embodiments of the present disclosure are described with reference to Examples below. It should be noted that the exemplary embodiments of the present disclosure are not limited by Examples.

Hereinafter, all "part" and "%" are on a mass basis unless otherwise specified.

Synthesis, treatment, production, and the like are conducted at room temperature (25° C.±3° C.) unless otherwise specified.

Example 1

Preparation of Dye-Colored Particles

- Polyester resin "FINEDIC M-8020" produced by DIC Corporation: 95 parts
- Fluorescent yellow dye Sy (C. I. Solvent Green 5) "Plast Yellow 8025" produced by Arimoto Chemical Industry Co., Ltd.: 5 parts The above components are mixed together while heated (170° C., 2 hours), and the resulting mixture is coarsely crushed with Banbury mixer. The mixture is further pulverized to 1.9 μm with a pulverizing machine "AFG100" produced by Hosokawa Micron Corporation. Hereby, dye-colored particles, which are polyester resin particles colored with the fluorescent yellow dye Sy, are prepared.

Preparation of Dye-Colored Particle Dispersion Liquid (1)

- Dye-Colored Particles: 200 parts
- Surfactant "Neogen RK" produced by Dai-ichi Kogyo Seiyaku Co., Ltd.: 15 parts (solid component concentration: 20%)
- Pure water: 785 parts The above materials are mixed together, and the resulting mixture is dispersed with a homogenizer "ULTRA-TURRAX T50" produced by IKA. Hereby, a dye-colored particle dispersion liquid (1) (solid component concentration: 20%) is prepared.

Preparation of Pigment Particle Dispersion Liquid (1)

- Yellow pigment Py (C. I. Pigment Yellow 3) "Corimax Yellow 10G" produced by Zeya Chemicals (Haimen) Co., Ltd.: 70 parts
- Anionic surfactant "Neogen RK" produced by Dai-ichi Kogyo Seiyaku Co., Ltd.: 30 parts (solid component concentration: 20%)
- Ion-exchange water: 200 parts The above components are mixed together, and the resulting mixture is pulverized to 0.2 μm with Key Mill (continuous type) "KMC-3" produced by Inoue Mfg., Inc. The solid content in the resulting dispersion liquid is adjusted to 20% by mass. Hereby, a pigment particle dispersion liquid (1) is prepared.

Preparation of Pigment Particle Dispersion Liquid (2)

- Green pigment Pgc (C. I. Pigment Green 36), "LIONOL GREEN 8624" produced by Toyocolor Co., Ltd.): 70 parts
- Anionic surfactant "Neogen RK" produced by Dai-ichi Kogyo Seiyaku Co., Ltd.: 30 parts (solid component concentration: 20%)
- Ion-exchange water: 200 parts The above components are mixed together, and the resulting mixture is pulverized to 0.2 μm with Key Mill (continuous type) "KMC-3" produced by Inoue Mfg., Inc. The solid content in the resulting dispersion liquid is adjusted to 20% by mass. Hereby, a pigment particle dispersion liquid (2) is prepared.

Preparation of Resin Particle Dispersion Liquid (1)

- Terephthalic acid: 30 molar parts
- Fumaric acid: 70 molar parts
- Bisphenol A-ethylene oxide adduct: 5 molar parts
- Bisphenol A-propylene oxide adduct: 95 molar parts The above materials are charged into a flask equipped with a stirrer, a nitrogen introduction tube, a temperature sensor, and a fractionating column. After the temperature of the resulting mixture has been increased to 220° C. over 1 hour, 1 part of titanium tetraethoxide relative to 100 parts of the materials is charged into the flask. While the product water is distilled away, the temperature is increased to 230° C. over 30 minutes. After the dehydration condensation reaction has been continued for 1 hour at the above temperature, the reaction product is cooled. Hereby, a polyester resin having a weight average molecular weight of 18,000 and a glass transition temperature of 60° C. is prepared.

Into a container equipped with a temperature control unit and a nitrogen purge unit, 40 parts of ethyl acetate and 25 parts of 2-butanol are charged in order to prepare a mixed solvent. To the mixed solvent, 100 parts of the polyester resin is gradually added in order to form a solution. To the solution, a 10-mass % aqueous ammonia solution is added in an amount that corresponds to three times the acid value of the resin in terms of molar ratio, and the resulting mixture is stirred for 30 minutes. Subsequently, the inside of the container is purged with dry nitrogen. While the temperature is kept at 40° C. and the liquid mixture is stirred, 400 parts of ion-exchange water is added dropwise to the container at a rate of 2 part/min. After the addition of ion-exchange water has been finished, the temperature is reduced to room temperature (20° C. to 25° C.). Subsequently, while stirring is performed, bubbling is performed for 48 hours using dry nitrogen in order to reduce the concentration of ethyl acetate and 2-butanol in the resulting resin particle dispersion liquid to 1,000 ppm or less. Then, ion-exchange water is added to the resin particle dispersion liquid in order to adjust the solid content in the resin particle dispersion liquid to 20% by mass. Hereby, a resin particle dispersion liquid (1) is prepared.

Preparation of Release Agent Particle Dispersion Liquid (1)

- Paraffin wax "HNP-9" produced by Nippon Seiro Co., Ltd.: 100 parts
- Anionic surfactant "Neogen RK" produced by Dai-ichi Kogyo Seiyaku Co., Ltd.: 1 part
- Ion-exchange water: 350 parts The above materials are mixed together, and the resulting mixture is heated to 100° C. and dispersed with a homogenizer "ULTRA-TURRAX T50" produced by IKA. Subsequently, further dispersion treatment is performed with a Manton-Gaulin high pressure homogenizer produced by Gaulin. Hereby, a release agent particle dispersion liquid (1) (solid content: 20% by mass), in which release agent particles having a volume average size of 200 nm are dispersed, is prepared.

Preparation of Toner Particles (1)

- Resin particle dispersion liquid (1): 335 parts
- Dye-colored particle dispersion liquid (1): 100 parts
- Pigment particle dispersion liquid (1): 15 parts
- Pigment particle dispersion liquid (2): 25 parts
- Release agent particle dispersion liquid (1): 25 parts
- Anionic surfactant "Neogen RK" Dai-ichi Kogyo Seiyaku Co., Ltd. (20%): 10 parts The above materials are charged into a round-bottomed, stainless steel flask. After the pH has been adjusted to 3.5 by the addition of 0.1 N (mol/L) nitric acid, 30 parts of an aqueous nitric acid solution having a polyaluminum chloride concentration of 10% by mass is added to the flask. The resulting mixture is dispersed with a homogenizer "ULTRA-TURRAX T50" produced by IKA at a liquid temperature of 30° C. and subsequently heated to 45° C. in an oil bath for heating. Then, holding is performed for 30 minutes. Subsequently, 50 parts of the resin particle dispersion liquid (1) is added to the flask, and holding is performed for 1 hour. To the flask, a 0.1-N aqueous sodium hydroxide solution is added in order to adjust the pH to 8.5. Subsequently, the temperature is increased to 84° C. and holding is performed for 2.5 hours. Then, the temperature is reduced to 20° C. at 20° C./min, and the solid component is separated from the liquid by filtering, washed thoroughly with ion-exchange water, and dried. Hereby, toner particles (1) are prepared. The volume average size of the toner particles (1) is 5.8 μm.

Preparation of Toner

With 100 parts by mass of the toner particles (1), 1.5 parts by mass of hydrophobic silica "RY50" produced by Nippon Aerosil Co., Ltd. and 1.0 parts by mass of hydrophobic titanium oxide "T805" produced by Nippon Aerosil Co., Ltd. are mixed using a sample mill at 10,000 revolutions per minute (rpm) for 30 seconds.

Subsequently, sieving is performed with a vibration sieve having an opening of 45 μm. Hereby, a fluorescent green toner (1) is prepared.

The volume average particle size of the fluorescent green toner (1) is 5.8 μm.

Preparation of Electrostatic Image Developer

A developer (i.e., electrostatic image developer) (1) is prepared by mixing 8 parts of the fluorescent green toner (1) with 92 parts of a carrier (1) prepared by the following method using a V-blender.

Preparation of Carrier (1)

Ferrite particles (average size: 35 μm): 100 parts
Toluene: 14 parts
Polymethyl methacrylate (MMA, weight average molecular weight: 75,000): 5 parts
Carbon black "VXC-72" produced by Cabot Corporation (volume resistivity: 100 Ωcm or less): 0.2 parts The above materials except the ferrite particles are dispersed with a sand mill to form a dispersion liquid. The dispersion liquid and the ferrite particles are charged into a degassing vacuum kneader. Then, while stirring is performed, the pressure is reduced and drying is performed. Hereby, a carrier (1) is prepared.

Examples 2 to 26 and Comparative Examples 1 to 5

A dye-colored particle dispersion liquid, a yellow pigment particle dispersion liquid, and a green pigment particle dispersion liquid are prepared as in Example 1, except that the fluorescent yellow dye Sy, the yellow pigment Py, and the green pigment Pgc used in the preparation of the dye-colored particle dispersion liquid (1), the yellow pigment particle dispersion liquid (1), and the green pigment particle dispersion liquid (1), respectively, are each changed to one of the dyes and pigments listed in Tables 1 and 2 as needed.

Toner particles of Examples 2 to 26 and Comparative Examples 1 to 5 are prepared by using the dispersion liquids prepared above and adjusting the amounts of the dispersion liquids.

Toners are prepared using the respective toner particle samples as in Example 1. Furthermore, developers of Examples 2 to 26 and Comparative Examples 1 to 5 are prepared using the respective toners.

Evaluation (1): Lightness and Chroma

A modification of an image forming apparatus "Revoria Press PC1120" produced by FUJIFILM Business Innovation Corp. is prepared. The green developer 1 is charged into a magenta developer. A blank image having an area coverage of 0% is formed on 100 OS coated paper sheets "OS Coat 127" produced by Oji Paper Co., Ltd. at a temperature of 22° C. and a humidity of 55% RH. Subsequently, a solid image having an area coverage of 100% (toner deposition density: 4.0 g/m2) is formed on an OS coated paper sheet using the fluorescent green toner.

The L*, a*, and b* values of the solid image in the CIE1976L*a*b* color system are measured using a reflection spectrodensitometer "X-Rite 939" (aperture diameter: 4 mm) produced by X-Rite, Inc. at 10 positions randomly selected from the solid image, and the averages of the L*, a*, and b* values are calculated. Furthermore, the chroma C* of the image is calculated using the following formula. The lightness L* and chroma C* may be maximized.

$$\text{Chroma } C^* = \{(a^*)^2 + (b^*)^2\}^{0.5}$$

The peak value of the spectral reflectance of the solid image is also measured.

Tables 1 and 2 list the results.

Evaluation (2): Color Difference ΔE

The color difference ΔE is determined using the solid image prepared in Evaluation (1) above.

The color difference ΔE between the solid image and Color Sample TOKA FLASH VIVA DX 650 produced by T&K TOKA is calculated using the following formula. Tables 1 and 2 list the results.

$$\Delta E = \sqrt{(L_1 - L_2)^2 + (a_1 - a_2)^2 + (b_1 - b_2)^2}$$

where $L_1$, $a_1$, and $b_1$ represent the L*, a*, and b* values of Color Sample TOKA FLASH VIVA DX 650, and $L_2$, $a_2$, and $b_2$ represent the L*, a*, and b* values of the solid image prepared in Examples. The L*, a, and b* values of Color Sample TOKA FLASH VIVA DX 650 are 77.7, −69.0, and 65.9, respectively.

TABLE 1

| | Fluorescent Dye | | | | Yellow pigment | | | Green/Cyan pigment | | | Content ratio | | Spectral reflectance ratio | |
|---|---|---|---|---|---|---|---|---|---|---|---|---|---|---|
| | Dye type | Peak wave-length X [nm] | RSy [%] | CSy [mass %] | Pigment type | Rpy [%] | CPy [mass %] | Pigment type | RPgc [%] | CPgc [mass %] | CSy/(CPy + CPgc) | (CSy + CPy)/CPgc | RPy/RSy | RPgc/RSy |
| Example 1 | SG5 | 520 | 111 | 1 | PY74 | 85 | 3 | PG36 | 80 | 5 | 0.125 | 0.80 | 0.76 | 0.72 |
| Example 2 | SY98 | 520 | 111 | 1 | PY74 | 85 | 3 | PG36 | 80 | 5 | 0.125 | 0.80 | 0.76 | 0.72 |
| Example 3 | SG5 | 520 | 111 | 1 | PY180 | 85 | 3 | PG36 | 80 | 5 | 0.125 | 0.80 | 0.76 | 0.72 |
| Example 4 | SG5 | 520 | 111 | 1 | PY74 | 85 | 3 | PB15:3 + PG36 | 65 | 1 + 3 | 0.143 | 1.00 | 0.76 | 0.59 |

TABLE 1-continued

| | Fluorescent Dye | | | | Yellow pigment | | | Green/Cyan pigment | | | Content ratio | | Spectral reflectance ratio | |
|---|---|---|---|---|---|---|---|---|---|---|---|---|---|---|
| | Dye type | Peak wavelength X [nm] | RSy [%] | CSy [mass %] | Pigment type | Rpy [%] | CPy [mass %] | Pigment type | RPgc [%] | CPgc [mass %] | CSy/ (CPy + CPgc) | (CSy + CPy)/ CPgc | RPy/ RSy | RPgc/ RSy |
| Example 5 | SG5 | 520 | 101 | 0.1 | PY74 | 85 | 3 | PG36 | 80 | 5 | 0.013 | 0.62 | 0.84 | 0.79 |
| Example 6 | SG5 | 520 | 105 | 1.5 | PY74 | 85 | 3 | PG36 | 80 | 5 | 0.188 | 0.90 | 0.81 | 0.76 |
| Example 7 | SG5 | 520 | 111 | 1 | PY74 | 82 | 5 | PG36 | 80 | 5 | 0.100 | 1.20 | 0.74 | 0.72 |
| Example 8 | SG5 | 520 | 111 | 1 | PY74 | 85 | 3 | PG 36 | 75 | 10 | 0.077 | 0.40 | 0.76 | 0.68 |
| Example 9 | SG5 | 520 | 90 | 2 | PY74 | 85 | 3 | PG36 | 80 | 5 | 0.250 | 1.00 | 0.94 | 0.89 |
| Example 10 | SG5 | 520 | 111 | 1 | PY74 | 85 | 3 | PB15:3 | 60 | 3 | 0.167 | 1.33 | 0.76 | 0.54 |
| Example 11 | SG5 | 520 | 101 | 0.1 | PY74 | 86 | 2 | PG36 | 76 | 8 | 0.010 | 0.26 | 0.86 | 0.76 |
| Example 12 | SG5 | 520 | 97 | 1.8 | PY74 | 86 | 2 | PG36 | 82 | 4 | 0.300 | 0.95 | 0.89 | 0.84 |
| Example 13 | SG5 | 520 | 105 | 0.3 | PY74 | 87 | 1.5 | PG36 | 78 | 6 | 0.040 | 0.30 | 0.83 | 0.74 |
| Example 14 | SG5 | 520 | 111 | 1 | PY74 | 82 | 5 | PG36 | 82 | 4 | 0.111 | 1.50 | 0.74 | 0.74 |

TABLE 2

| | Fluorescent Dye | | | | Yellow pigment | | | Green/Cyan pigment | | | Content ratio | | Spectral reflectance ratio | |
|---|---|---|---|---|---|---|---|---|---|---|---|---|---|---|
| | Dye type | Peak wavelength X [nm] | RSy [%] | CSy [mass %] | Pigment type | Rpy [%] | CPy [mass %] | Pigment type | RPgc [%] | CPgc [mass %] | CSy/ (CPy + CPgc) | (CSy + CPy)/ CPgc | RPy/ RSy | RPgc/ RSy |
| Example 15 | SG5 | 520 | 107 | 0.4 | PY74 | 85 | 3 | PG 36 | 80 | 5 | 0.050 | 0.68 | 0.79 | 0.75 |
| Example 16 | SG5 | 520 | 111 | 1 | PY74 | 86 | 2 | PG36 | 84 | 3 | 0.200 | 1.00 | 0.78 | 0.76 |
| Example 17 | SG5 | 520 | 111 | 1 | PY74 | 85 | 3 | PG36 | 75 | 8.8 | 0.085 | 0.45 | 0.76 | 0.68 |
| Example 18 | SG5 | 520 | 90 | 2 | PY74 | 85 | 3 | PG36 | 80 | 5 | 0.250 | 1.00 | 0.94 | 0.89 |
| Example 19 | SG5 | 520 | 111 | 1 | PY74 | 87 | 1.5 | PG36 | 80 | 5 | 0.154 | 0.50 | 0.78 | 0.72 |
| Example 20 | SG5 | 520 | 111 | 1 | PY74 | 82 | 5 | PG36 | 80 | 5 | 0.100 | 1.20 | 0.74 | 0.72 |
| Example 21 | SG5 | 520 | 111 | 1 | PY74 | 85 | 3 | PG 36 | 84 | 3 | 0.167 | 1.33 | 0.76 | 0.76 |
| Example 22 | SG5 | 520 | 111 | 1 | PY74 | 85 | 3 | PG36 | 75 | 10 | 0.077 | 0.40 | 0.76 | 0.68 |
| Example 23 | SG5 | 520 | 105 | 1.5 | PY74 | 85 | 3 | PG36 | 80 | 5 | 0.188 | 0.90 | 0.81 | 0.76 |
| Example 24 | SG5 | 520 | 111 | 1 | PY74 | 85 | 3 | PG36 | 76 | 8 | 0.091 | 0.50 | 0.76 | 0.68 |
| Example 25 | SG5 | 520 | 111 | 1 | PY74 | 72 | 12 | PG 36 | 75 | 9 | 0.048 | 1.44 | 0.65 | 0.68 |
| Example 26 | SG5 | 520 | 111 | 1 | PY74 | 85 | 3 | PG36 | 61 | 13 | 0.063 | 0.31 | 0.76 | 0.55 |
| Comparative Example 1 | SG5 | 520 | 105 | 1.5 | — | — | — | PB15:3 | 60 | 3 | 0.500 | 0.50 | — | 0.57 |
| Comparative Example 2 | SG5 | 520 | 101 | 0.1 | PY74 | 86 | 2 | PG36 | 75 | 9 | 0.009 | 0.23 | 0.86 | 0.75 |
| Comparative Example 3 | SG5 | 520 | 90 | 2 | PY74 | 86 | 2 | PG36 | 82 | 4 | 0.333 | 1.00 | 0.96 | 0.91 |
| Comparative Example 4 | SG5 | 520 | 105 | 0.3 | PY74 | 87 | 1.5 | PG 36 | 77 | 7 | 0.035 | 0.26 | 0.83 | 0.73 |
| Comparative Example 5 | SG5 | 520 | 105 | 1.5 | PY74 | 82 | 5 | PG36 | 82 | 4 | 0.167 | 1.63 | 0.78 | 0.78 |

The symbols used in Tables 1 and 2 represent the following pigments and dyes.

SG5: C. I. Solvent Green 5 (fluorescent yellow pigment Sy), "Plast Yellow 8025" produced by Arimoto Chemical Industry Co., Ltd.

SY98: C. I. Solvent Yellow 98 (fluorescent yellow pigment Sy), "Plast Yellow DY-436" produced by Arimoto Chemical Industry Co., Ltd.

PY74: C. I. Pigment Yellow 74 (yellow pigment Py: nonfluorescent pigment), "Corimax Yellow 2GX-70" produced by Zeya Chemicals (Haimen) Co., Ltd.

PY180: C. I. Pigment Yellow 180 (yellow pigment Py: nonfluorescent pigment), "Corimax Yellow HG" produced by Zeya Chemicals (Haimen) Co., Ltd.

PG36: C. I. Pigment Green 36 (pigment Pgc, green pigment: nonfluorescent pigment), "LIONOL GREEN 8624" produced by Toyocolor Co., Ltd.

PB15:3: C. I. Pigment Blue 15:3 (pigment Pgc, cyan pigment: nonfluorescent pigment), "LIONOL BLUE FG-7330" produced by Toyocolor Co., Ltd.

TABLE 3

| | Image color evaluation | | | | | |
|---|---|---|---|---|---|---|
| | L* | a* | b* | C* | Reflectance at 520 nm [%] | Color difference ΔE for VIVA650 |
| Example 1 | 75 | −67 | 65 | 93 | 75 | 3.4 |
| Example 2 | 75 | −67 | 65 | 93 | 75 | 3.4 |
| Example 3 | 74 | −66 | 65 | 93 | 75 | 4.8 |
| Example 4 | 63 | −70 | 55 | 89 | 61 | 18.2 |
| Example 5 | 70 | −65 | 63 | 91 | 68 | 9.1 |
| Example 6 | 70 | −68 | 66 | 95 | 71 | 7.8 |

TABLE 3-continued

| | Image color evaluation | | | | | |
|---|---|---|---|---|---|---|
| | L* | a* | b* | C* | Reflectance at 520 nm [%] | Color difference ΔE for VIVA650 |
| Example 7 | 72 | −67 | 70 | 97 | 73 | 7.5 |
| Example 8 | 70 | −75 | 53 | 92 | 71 | 15.9 |
| Example 9 | 60 | −69 | 67 | 96 | 61 | 17.8 |
| Example 10 | 63 | −70 | 45 | 83 | 57 | 25.3 |
| Example 11 | 68 | −60 | 50 | 78 | 66 | 20.5 |
| Example 12 | 69 | −58 | 61 | 84 | 68 | 14.8 |
| Example 13 | 73 | −61 | 42 | 74 | 72 | 25.4 |
| Example 14 | 74 | −42 | 61 | 74 | 75 | 27.6 |
| Example 15 | 75 | −67 | 62 | 91 | 73 | 4.9 |
| Example 16 | 79 | −65 | 68 | 94 | 80 | 4.8 |
| Example 17 | 70 | −68 | 60 | 91 | 71 | 9.6 |
| Example 18 | 62 | −65 | 62 | 90 | 61 | 16.6 |
| Example 19 | 77 | −69 | 61 | 92 | 77 | 4.7 |
| Example 20 | 72 | −67 | 70 | 97 | 73 | 7.5 |
| Example 21 | 79 | −65 | 65 | 92 | 79 | 4.2 |
| Example 22 | 70 | −75 | 53 | 92 | 71 | 15.9 |
| Example 23 | 71 | −66 | 65 | 93 | 71 | 7.4 |
| Example 24 | 72 | −72 | 60 | 94 | 72 | 8.5 |
| Example 25 | 65 | −70 | 80 | 106 | 56 | 19.2 |
| Example 26 | 64 | −70 | 60 | 92 | 50 | 14.8 |
| Comparative Example 1 | 62 | −60 | 20 | 63 | 63 | 49.1 |
| Comparative Example 2 | 64 | −62 | 35 | 71 | 65 | 34.2 |
| Comparative Example 3 | 61 | −48 | 52 | 71 | 63 | 30.1 |
| Comparative Example 4 | 70 | −60 | 30 | 67 | 71 | 37.5 |
| Comparative Example 5 | 69 | −32 | 65 | 72 | 70 | 38.0 |

The results described in Table 3 confirm that, in the cases where the toners prepared in Examples are used, images excellent in terms of chroma C* may be formed without reducing lightness L*, compared with the cases where the toners prepared in Comparative Examples are used.

Moreover, in the cases where the toners prepared in Examples are used, the color differences ΔE between the images formed using the toners prepared in Examples and Color Sample TOKA FLASH VIVA DX 650 may be reduced.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A fluorescent green toner including toner particles including:

a fluorescent yellow dye Sy, a peak wavelength of a spectral reflectance of the fluorescent yellow dye Sy being at 500 nm or more and 550 nm or less;

a yellow pigment Py; and at least one pigment Pgc selected from the group consisting of a green pigment and a cyan pigment, wherein:

CSy/(CPy+CPgc) is 0.01 or more and 0.3 or less, and (CSy+CPy)/CPgc is 0.3 or more and 1.5 or less, where CSy, CPy, and CPgc represent contents of the fluorescent yellow dye Sy, the yellow pigment Py, and the pigment Pgc in the toner particles, respectively.

(((2))) The fluorescent green toner according to (((1))), wherein the CSy/(CPy+CPgc) is 0.05 or more and 0.2 or less, and the (CSy+CPy)/CPgc is 0.45 or more and 1.0 or less.

(((3))) The fluorescent green toner according to (((1))), wherein the content CSy of the fluorescent yellow dye Sy is 0.1% by mass or more and 2.0% by mass or less, the content CPy of the yellow pigment Py is 1.5% by mass or more and 5.0% by mass or less, and the content CPgc of the pigment Pgc is 3.0% by mass or more and 10.0% by mass or less.

(((4))) The fluorescent green toner according to (((3))), wherein the content CSy of the fluorescent yellow dye Sy is 0.1% by mass or more and 1.5% by mass or less, the content CPy of the yellow pigment Py is 3.0% by mass or more and 5.0% by mass or less, and the content CPgc of the pigment Pgc is 5.0% by mass or more and 8.0% by mass or less.

(((5))) The fluorescent green toner according to (((1))), wherein 0.65RSy≤RPy, and 0.55RSy≤RPgc, where RSy represents a spectral reflectance of the fluorescent yellow dye Sy at a peak wavelength X, RPy represents a spectral reflectance of the yellow pigment Py at the wavelength X, and RPgc represents a spectral reflectance of the pigment Pgc at the wavelength X.

(((6))) The fluorescent green toner according to (((5))), wherein 0.8RPy≤RPgc≤1.2RPy.

(((7))) The fluorescent green toner according to (((1))), wherein the pigment Pgc is a green pigment, and the fluorescent yellow dye Sy is C. I. Solvent Green 5 or C. I. Solvent Yellow 98, and the green pigment is C. I. Pigment Green 36 or C. I. Pigment Green 7.

(((8))) An electrostatic image developer including:

the fluorescent green toner according to any one of (((1))) to (((7))).

(((9))) A toner cartridge detachably attachable to an image forming apparatus, the toner cartridge including:

the fluorescent green toner according to any one of (((1))) to (((7))).

(((10))) A process cartridge detachably attachable to an image forming apparatus, the process cartridge including:

a developing unit that includes the electrostatic image developer according to (((8))) and develops an electrostatic image formed on a surface of an image holding member with the electrostatic image developer to form a toner image.

(((11))) An image forming apparatus including:

an image holding member;

a charging unit that charges a surface of the image holding member;

an electrostatic image formation unit that forms an electrostatic image on the charged surface of the image holding member;

a developing unit that includes the electrostatic image developer according to (((8))) and develops the electrostatic image formed on the surface of the image holding member with the electrostatic image developer to form a toner image;

a transfer unit that transfers the toner image formed on the surface of the image holding member onto a surface of a recording medium; and a fixing unit that fixes the toner image transferred on the surface of the recording medium.

(((12))) An image forming method including:

charging a surface of an image holding member;

forming an electrostatic image on the charged surface of the image holding member;

developing the electrostatic image formed on the surface of the image holding member with the electrostatic image developer according to (((8))) to form a toner image;

transferring the toner image formed on the surface of the image holding member onto a surface of a recording medium; and fixing the toner image transferred on the surface of the recording medium.

(((13))) An image forming apparatus including:

first to sixth electrophotographic image forming units that each form a corresponding one of pink, yellow, magenta, cyan, black, and green images, wherein one of the first to sixth image forming units which forms a green image includes the electrostatic image developer according to (((8))).

(((14))) An image forming method including:

first to sixth electrophotographic image formation steps each including forming a corresponding one of pink, yellow, magenta, cyan, black, and green images, wherein, in the image formation step including forming an green image, the electrostatic image developer according to (((8))) is used.

(((15))) A printed material including:

a recording medium; and an image formed on a surface of the recording medium using the fluorescent green toner according to any one of (((1))) to (((7))).

What is claimed is:

1. A fluorescent green toner comprising toner particles including:

a fluorescent yellow dye Sy, a peak wavelength of a spectral reflectance of the fluorescent yellow dye Sy being at 500 nm or more and 550 nm or less;

a yellow pigment Py; and at least one pigment Pgc selected from the group consisting of a green pigment and a cyan pigment, wherein:

CSy/(CPy+CPgc) is 0.01 or more and 0.3 or less, and (CSy+CPy)/CPgc is 0.3 or more and 1.5 or less, where CSy, CPy, and CPgc represent contents of the fluorescent yellow dye Sy, the yellow pigment Py, and the pigment Pgc in the toner particles, respectively.

2. The fluorescent green toner according to claim 1, wherein the CSy/(CPy+CPgc) is 0.05 or more and 0.2 or less, and the (CSy+CPy)/CPgc is 0.45 or more and 1.0 or less.

3. The fluorescent green toner according to claim 1, wherein the content CSy of the fluorescent yellow dye Sy is 0.1% by mass or more and 2.0% by mass or less, the content CPy of the yellow pigment Py is 1.5% by mass or more and 5.0% by mass or less, and the content CPgc of the pigment Pgc is 3.0% by mass or more and 10.0% by mass or less.

4. The fluorescent green toner according to claim 3, wherein the content CSy of the fluorescent yellow dye Sy is 0.1% by mass or more and 1.5% by mass or less, the content CPy of the yellow pigment Py is 3.0% by mass or more and 5.0% by mass or less, and the content CPgc of the pigment Pgc is 5.0% by mass or more and 8.0% by mass or less.

5. The fluorescent green toner according to claim 1, wherein $0.65RSy \leq RPy$, and $0.55RSy \leq RPgc$, where RSy represents a spectral reflectance of the fluorescent yellow dye Sy at a peak wavelength X, RPy represents a spectral reflectance of the yellow pigment Py at the wavelength X, and RPgc represents a spectral reflectance of the pigment Pgc at the wavelength X.

6. The fluorescent green toner according to claim 5, wherein $0.8RPy \leq RPgc \leq 1.2RPy$.

7. The fluorescent green toner according to claim 1, wherein the pigment Pgc is a green pigment, and the fluorescent yellow dye Sy is C. I. Solvent Green 5 or C. I. Solvent Yellow 98, and the green pigment is C. I. Pigment Green 36 or C. I. Pigment Green 7.

8. An electrostatic image developer comprising:

the fluorescent green toner according to claim 1.

9. An electrostatic image developer comprising:

the fluorescent green toner according to claim 2.

10. An electrostatic image developer comprising:

the fluorescent green toner according to claim 3.

11. An electrostatic image developer comprising:

the fluorescent green toner according to claim 4.

12. An electrostatic image developer comprising:

the fluorescent green toner according to claim 5.

13. An electrostatic image developer comprising:

the fluorescent green toner according to claim 7.

14. A toner cartridge detachably attachable to an image forming apparatus, the toner cartridge comprising:

the fluorescent green toner according to claim 1.

15. A process cartridge detachably attachable to an image forming apparatus, the process cartridge comprising:

a developing unit that includes the electrostatic image developer according to claim 8 and develops an electrostatic image formed on a surface of an image holding member with the electrostatic image developer to form a toner image.

16. An image forming apparatus comprising:

an image holding member;

a charging unit that charges a surface of the image holding member;

an electrostatic image formation unit that forms an electrostatic image on the charged surface of the image holding member;

a developing unit that includes the electrostatic image developer according to claim 8 and develops the electrostatic image formed on the surface of the image holding member with the electrostatic image developer to form a toner image;

a transfer unit that transfers the toner image formed on the surface of the image holding member onto a surface of a recording medium; and a fixing unit that fixes the toner image transferred on the surface of the recording medium.

17. An image forming method comprising:

charging a surface of an image holding member;

forming an electrostatic image on the charged surface of the image holding member;

developing the electrostatic image formed on the surface of the image holding member with the electrostatic image developer according to claim 8 to form a toner image;

transferring the toner image formed on the surface of the image holding member onto a surface of a recording medium; and fixing the toner image transferred on the surface of the recording medium.

18. An image forming apparatus comprising:

first to sixth electrophotographic image forming units that each form a corresponding one of pink, yellow, magenta, cyan, black, and green images, wherein one of the first to sixth image forming units which forms a green image includes the electrostatic image developer according to claim 8.

19. An image forming method comprising:

first to sixth electrophotographic image formation steps each including forming a corresponding one of pink, yellow, magenta, cyan, black, and green images, wherein, in the image formation step including forming an green image, the electrostatic image developer according to claim 8 is used.

20. A printed material comprising:

a recording medium; and an image formed on a surface of the recording medium using the fluorescent green toner according to claim 1.

* * * * *